Figures 1, 2:
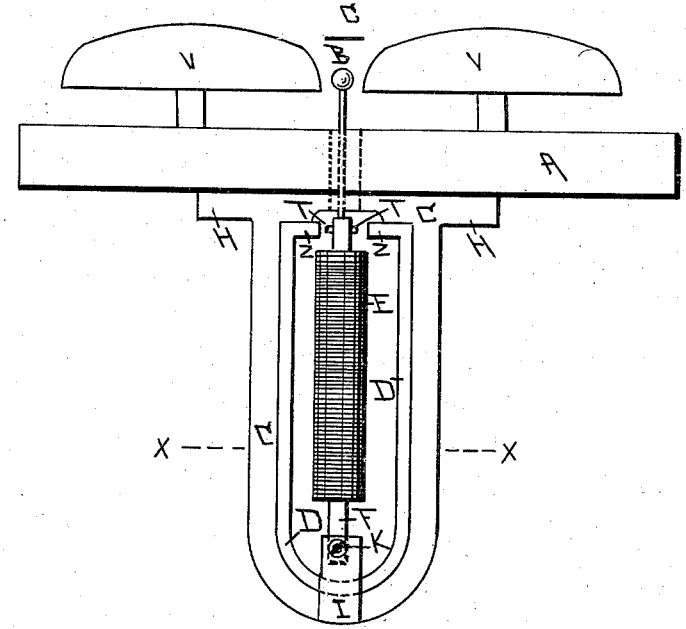

(No Model.)

F. E. FISHER.
MAGNETO ELECTRIC BELL.

No. 335,999. Patented Feb. 9, 1886.

ATTEST
Jno. A. Wood
Jno. C. Grout

INVENTOR
Frank E. Fisher
by Geo. H. Lothrop
Atty

United States Patent Office.

FRANK E. FISHER, OF DETROIT, MICHIGAN.

MAGNETO-ELECTRIC BELL.

SPECIFICATION forming part of Letters Patent No. 335,999, dated February 9, 1886.

Application filed July 14, 1885. Serial No. 171,598. (No model.)

*To all whom it may concern:*

Be it known that I, FRANK E. FISHER, of the city of Detroit, in the county of Wayne and State of Michigan, have invented a new and useful Improvement in Magneto-Electric Bells, of which the following is a specification.

My invention consists in an improvement in alternating-current electric bells, hereinafter fully pointed out in the claims.

Figure 1 is a section on the line $x\,x$, Fig. 2; and Fig. 2 is an elevation of the bell.

D represents a permanent magnet, U-shaped, with its poles Z Z preferably turned toward each other, as clearly shown in Fig. 2.

C represents a diamagnetic soft-metal frame surrounding the permanent magnet, and formed by pouring the melted soft metal—such as lead or type-metal—around the magnet in a mold.

H H represent flanges on the soft-metal frame, by which it can be secured to a supporting-board, A.

I represents an extension of the frame D toward the center of the magnet, and there is an extension, I, at each side, as shown in Fig. 1.

F represents a piece of magnetic metal, not a permanent magnet, which is pivoted at one end between the extensions I by means of two pointed-screws, K K, one of which is tapped through each extension I and enters a conical hole in the side of F, thus forming pivots on which F can vibrate.

F is the armature of the bell, and extends between and beyond the poles of the magnet D, and carries at its end a striker, B. Where the armature F passes between the poles of the magnet, a piece of diamagnetic metal, T, is set therein, projecting somewhat, so that when the armature vibrates the diamagnetic metal T will come in contact with the poles of the magnet, and the armature will not stick to either pole.

E represents a helix of insulated wire wound around the armature, and its ends are connected with an electrical circuit in which is a magneto-electric generator to create alternate currents.

V V represent two bells, one on each side of the striker B.

The operation of my invention is as follows: When alternating currents of electricity are sent through the helix E, the armature F is magnetized and a pair of poles formed thereon, one at each end, and the polarity of each end of the armature is changed with each alternation of the current. When the free end of the armature, which lies between the poles of the permanent magnet D, is positive, the positive pole of the magnet will repel and the negative pole of the magnet attract the armature, and when this end of the armature becomes negative it will be attracted and repelled in an opposite direction, so that the armature will be kept constantly in rapid vibration so long as the current passes, and the striker B will cause the bells V V to sound. As soon as the current ceases the armature will come to a state of rest.

What I claim as my invention, and desire to secure by Letters Patent, is—

1. An electric bell consisting of a permanent magnet of U form rigidly held in a surrounding frame of soft metal cast around said magnet, a vibrating armature pivoted between lugs formed on said frame, a helix of insulated wire wound upon said armature, and bells between which the end of the armature vibrates, substantially as described.

2. An electric bell consisting of a permanent magnet of U form, having its ends turned inward and its body rigidly held in a surrounding frame of soft metal cast around said magnet, a vibrating armature consisting of an electro-magnet having one pole pivoted between lugs formed on said frame, and having its other pole free to vibrate between the inwardly-turned ends of the permanent magnet, a helix of insulated wire wound upon said electro-magnet, and bells between which a striker upon its free end vibrates, substantially as described.

FRANK E. FISHER.

Witnesses:
GEO. H. LOTHROP,
W. A. JACKSON.